J. L. MILLER.
MOTOR CYCLE SEAT AND SUPPORT THEREFOR.
APPLICATION FILED DEC. 4, 1912.
1,071,255.
Patented Aug. 26, 1913.
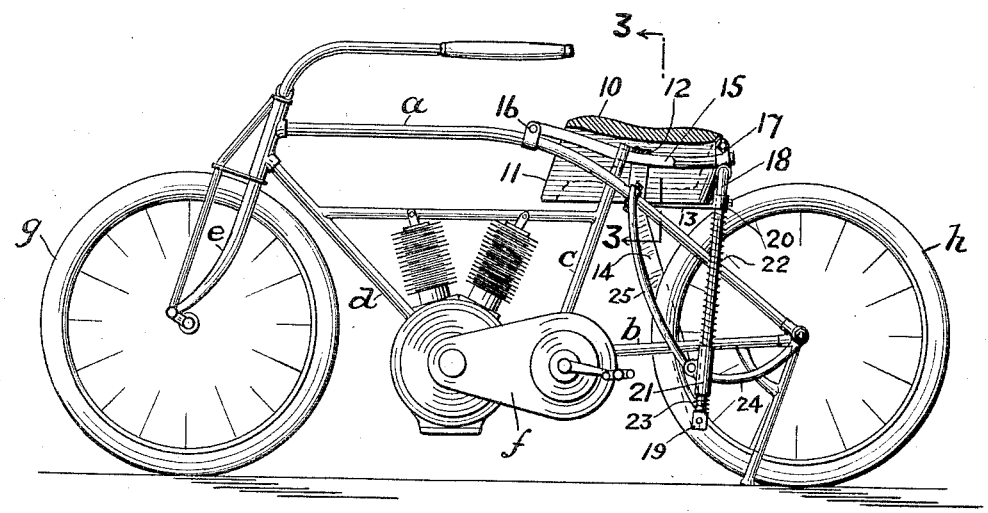
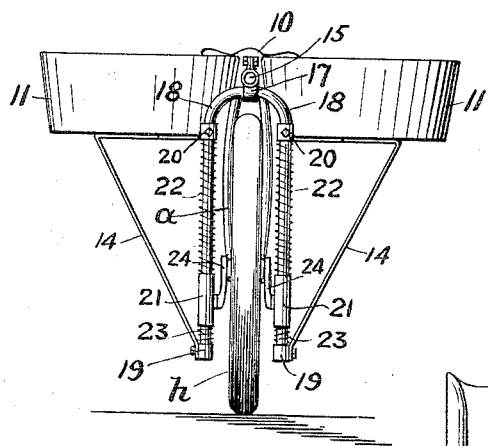
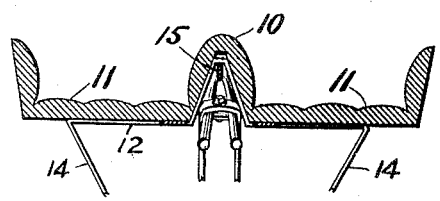
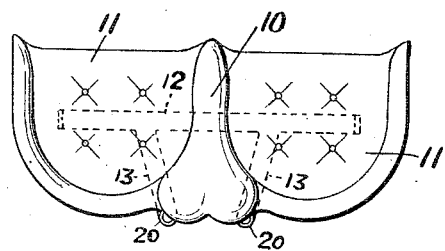
WITNESSES:
Rob't R. Kitchel
E. E. Wall
INVENTOR
John L. Miller
BY
Frank L. Busser
ATTORNEY.

UNITED STATES PATENT OFFICE.

JOHN L. MILLER, OF PAULSBORO, NEW JERSEY.

MOTOR-CYCLE SEAT AND SUPPORT THEREFOR.

1,071,255.   Specification of Letters Patent.   Patented Aug. 26, 1913.

Application filed December 4, 1912. Serial No. 734,846.

*To all whom it may concern:*

Be it known that I, JOHN L. MILLER, a citizen of the United States, residing at Paulsboro, county of Gloucester, and State of New Jersey, have invented a new and useful Improvement in Motor-Cycle Seats and Supports Therefor, of which the following is a full, clear, and exact description, reference being had to the accompanying drawings, which form a part of this specification.

My invention relates to motor cycles and particularly to saddles or seats therefor, and also to supports for the same.

The invention comprises a double seat adapted for the support of two riders side by side, said seats being so constructed and connected as to provide an intermediate saddle for the support of a single rider, thereby adapting the cycle to carry either one or two riders.

The invention also comprises means for supporting the combination double seat and single saddle.

In the drawings: Figure 1 is a side elevation of a motor cycle embodying my improvement. Fig. 2 is a rear elevation of the same. Fig. 3 is a section on the line 3—3 of Fig. 1. Fig. 4 is a plan view of the seat.

The different members of the main frame are designated by the letters $a$, $b$, $c$, $d$ and $e$. The engine and crank casing is represented by $f$, the front wheel by $g$ and the rear wheel by $h$. These parts do not involve any substantial departure from the ordinary motor cycle and need not, therefore, be more particularly described.

The combination double seat and single saddle comprises an elevated central saddle-shaped member 10 and depressed side members shaped to form seats 11. The side walls of the saddle 10 form the inner side walls of the seats 11. The rear walls and outer side walls of the seats 11 extend upward to approximately the level of the saddle. The combination single saddle and double seat, which preferably is made in a unitary form, rests upon the transversely extending member 12 of a keystone shaped frame 12—13—14. The central portion of the member 12 is bent upward within the saddle member 10 and rests upon and is secured to a saddle-supporting bar 15, which, like the ordinary saddle-supporting bar is pivoted on a collar 16 secured to the member $a$ of the frame. The front and central portion of the bar 15 is of flat shape and arranged on edge and rests within a notch in the upper end of the member $c$ of the main frame, while its rear portion is of circular cross-section and extends into a hanger 17, to which it is clamped. Supported from the hanger is an inverted U-shaped frame 18, having at its lower ends fixed heads 19. The rearwardly extending members 13 of the saddle-supporting frame carry collars 20, through which extend the depending legs of the frame 18, the collars 20 being fixedly secured to said legs. The diagonally downwardly extending members 14 of the saddle supporting frame are secured at their lower ends to the heads 19 of the U-shaped frame 18. Near their lower ends the legs of the frame 18 extend loosely through sleeves 21, which are supported from the main frame as hereinafter described. Supporting springs 22 are confined between the collars 20 and sleeves 21 and springs 23 are confined between sleeves 21 and heads 19. Projecting forward from the axle on both sides of the rear wheel $h$ are arms 24. Secured to or integral with the outer ends of arms 24 are the upwardly extending arms 25, which converge and extend over the forks of the member $a$ of the main frame and are secured thereto. To this frame 24—25 are pivoted the sleeves 21. Thus the combination double seat and single saddle is supported on a frame which, while giving ample support to the seat and being itself supported with the necessary stability, can yield in every direction to the degree required to absorb shocks and comfortably support the rider or riders.

One of the difficulties inherent in the construction of a motor cycle is to so locate the seat that the weight of the rider will be properly distributed between the front and rear wheels, it being desirable that the rear wheel shall bear a weight adequate to insure efficient traction, while it is also desirable that the front wheel shall at all times bear the degree of weight necessary to enable proper steering. These difficulties are enhanced in a two seated cycle: and it is obvious that when these seats are arranged in tandem, the proper distribution of the load will take place only when both seats are occupied; for if a single rider occupies either of the seats, one or the other of the wheels will bear an improper proportion of the weight. If the seats are arranged side by side, then, while the cycle can be propelled by a single rider, occupying either seat, this obviously involves the sidewise unbalancing of the machine. With my improved construction, however, the combination seat and saddle can be located at a point in the longitudinal extension of the cycle best adapted to meet the load-distribution requirement, whether the cycle be occupied by either one or two riders. Further, no adjustment whatever is necessary to adapt the cycle to either condition; the cycle being always adjusted to receive either one rider or two.

While the supporting means for the combination double seat and single saddle is of special value to meet the requirements of my invention, it is obvious that such means are also adapted for the support of a single or double saddle of any construction.

While the preferred embodiment of my invention involves a saddle-shaped central seat and depressed side seats, my invention, in its broader aspect, is not limited to this precise arrangement.

Having now fully described my invention, what I claim and desire to protect by Letters Patent is:

1. A saddle for cycles comprising two outer seats arranged transversely relatively one to the other and adapted for the support of two riders, and an intermediate single seat connecting the outer seats and adapted for the support of a single rider.

2. A saddle for cycles comprising a central seat arranged for the support of a single rider, and outer seats for the support of two riders, said outer seats being arranged on opposite sides of the central seat and having side walls common to the side walls of the central seat.

3. A saddle for cycles comprising an elevated central seat having a convexly shaped upper face of saddle shape and concavely shaped outer seats on opposite sides and below the level of the central seat.

4. A saddle for cycles comprising two side seats each having a seat proper and upwardly extending rear and side walls, and an elevated central seat connecting the upper portions of the inner walls of the two side seats.

5. The combination with the main frame, of a saddle, a saddle-supporting frame upon which the saddle rests, a bar pivoted on the main frame, a frame hung from said bar, the saddle supporting frame being secured to the hanging frame, a fourth frame supported from the main frame, and springs interposed between the fourth frame and the saddle-supporting and hanging frames.

6. The combination with the main frame, of a saddle, a saddle-supporting frame, a bar pivoted on the main frame, a frame hung from said bar and secured to the saddle supporting frame, a fourth frame supported from the main frame, members pivoted on the fourth frame and sleeved on the hanging frame, and springs interposed betwen said members and the saddle-supporting and hanging frames.

7. The combination with the main frame, of a saddle, a saddle-supporting frame, a bar pivoted on the main frame, a two-legged frame hung from said bar, the saddle supporting frame being secured to both legs of the last named frame at the upper and lower parts thereof, members sleeved on said legs, springs supported by said members and supporting the two last-named frames, and means supporting said members from the main frame.

8. The combination with the main frame, of a saddle, a saddle-supporting frame, a bar pivoted on the main frame, a two-legged frame hung from said bar, the saddle supporting frame being secured to both legs of the last named frame at the upper and lower parts thereof, sleeves on said legs, springs above and supported by said sleeves and supporting the two last named frames, springs below said sleeves and between the same and the two last named frames, and means by which the sleeves are pivotally supported from the main frame.

9. The combination with the main frame, of a saddle, a saddle-supporting frame comprising a transverse member, rearwardly extending members and downwardly and diagonally extending members; a bar pivoted on the main frame and directly supporting the central part of said transverse member, a two legged-frame hung from said bar, collars on the upper portions of the legs of the last named frame and secured both to the legs and to said rearwardly extending members, heads on the lower portions of said legs and secured both to the legs and to said downwardly diagonally extending members, sleeves loose on the legs between said collars and heads, relatively long springs between said sleeves and collars, relatively short springs between said sleeves and heads, and means by which the sleeves are pivotally supported from the main frame.

10. The combination with the main frame, of a saddle comprising an upraised central portion and depressed side portions, a saddle supporting frame including a transversely extending member having a central portion extending upward between the side portions of the seat, a bar pivoted on the main frame and extending rearward between the side portions of the seat and directly supporting the upwardly extending central portion of the transverse member of the saddle-supporting frame, a frame supported by said bar and supporting the saddle-supporting frame, springs supporting the two last named frames, members supporting the springs, and means by which said members are pivotally supported from the main frame.

11. The combination with the main frame, of sleeves pivotally supported therefrom, a frame comprising two upright legs extending through said sleeves, springs between said sleeves and the last-named frame, a saddle, a saddle supporting frame secured to the last named frame, and means by which the two-legged frame is rockingly supported on the main frame.

12. The combination with the main frame, of a saddle, a saddle-supporting frame, a two legged frame secured to the saddle supporting frame at the upper and lower portions of each leg, means rockingly supporting the two legged frame on the main frame, sleeves through which said legs extend, springs between said sleeves and the two legged frame and saddle-supporting frame, and means by which said sleeves are pivotally supported from the main frame.

In testimony of which invention, I have hereunto set my hand, at Philadelphia, on this 3d day of December, 1912.

JOHN L. MILLER.

Witnesses:
M. M. HAMILTON,
E. E. WALL.